(12) United States Patent
Zhao

(10) Patent No.: US 9,313,850 B2
(45) Date of Patent: Apr. 12, 2016

(54) DIMMING APPARATUS FOR LEDS

(71) Applicant: Wei Zhao, Allen, TX (US)

(72) Inventor: Wei Zhao, Allen, TX (US)

( * ) Notice: Subject to any disclaimer, the term of this patent is extended or adjusted under 35 U.S.C. 154(b) by 318 days.

(21) Appl. No.: 13/987,414

(22) Filed: Jul. 23, 2013

(65) Prior Publication Data

US 2014/0028202 A1    Jan. 30, 2014

Related U.S. Application Data

(60) Provisional application No. 61/741,615, filed on Jul. 24, 2012.

(51) Int. Cl.
*H05B 33/08* (2006.01)

(52) U.S. Cl.
CPC ........ *H05B 33/0845* (2013.01); *H05B 33/0812* (2013.01); *H05B 33/0815* (2013.01); *H05B 33/0896* (2013.01); *Y02B 20/36* (2013.01)

(58) Field of Classification Search
CPC .......... H05B 33/0845; H05B 33/0812; H05B 33/0896; H05B 33/0815; Y02B 20/36
See application file for complete search history.

(56) References Cited

U.S. PATENT DOCUMENTS

| | | | | |
|---|---|---|---|---|
| 5,872,429 A * | 2/1999 | Xia | ............ | H05B 37/0263 315/194 |
| 7,525,293 B1 * | 4/2009 | Notohamiprodjo | ... | H02M 1/425 315/219 |
| 7,936,132 B2 * | 5/2011 | Quek | ............ | H05B 33/0815 315/291 |
| 8,258,710 B2 * | 9/2012 | Alexandrovich | .. | H05B 33/0815 315/119 |
| 8,334,659 B2 * | 12/2012 | Aurongzeb | ........ | H05B 33/0845 315/225 |
| 8,395,329 B2 * | 3/2013 | Jutras | ............ | H05B 33/0851 315/246 |
| 8,410,720 B2 * | 4/2013 | Holec | ............ | F21V 23/005 315/209 R |
| 8,466,628 B2 * | 6/2013 | Shearer | ............ | H05B 33/0815 315/209 R |
| 8,536,806 B2 * | 9/2013 | Kitagawa | ............ | H05B 33/0812 315/186 |
| 8,629,619 B2 * | 1/2014 | Clauberg | ............ | H05B 33/0815 315/119 |
| 8,674,605 B2 * | 3/2014 | Puvanakijja-korn | ............ | H05B 33/0809 315/200 R |
| 8,749,174 B2 * | 6/2014 | Angeles | ............ | H05B 33/083 315/219 |
| 8,975,820 B2 * | 3/2015 | Seidmann | ............ | H05B 33/0845 315/149 |
| 9,066,394 B2 * | 6/2015 | Jacobs | ............ | H05B 33/0815 |
| 2007/0247084 A1 * | 10/2007 | Zhao | ............ | H05B 39/045 315/291 |
| 2013/0141001 A1 * | 6/2013 | Datta | ............ | H05B 33/0809 315/224 |
| 2013/0249437 A1 * | 9/2013 | Wang | ............ | H05B 33/0815 315/307 |
| 2013/0321038 A1 * | 12/2013 | Zhao | ............ | H03K 17/063 327/109 |
| 2014/0285103 A1 * | 9/2014 | Acharya | ............ | H05B 33/0812 315/206 |
| 2014/0321860 A1 * | 10/2014 | Kido et al. | ............ | H04B 10/116 398/118 |

* cited by examiner

*Primary Examiner* — Michael Zarroli

(57) ABSTRACT

A dimming way without turning on/off is to change output voltage for LED or OLED lamp corresponding to dimming percentage without turn on and off LED or OLED lamp; The dimming control signal can come from a keyboard, a phase dimmer, a dimmer button or a computer; The dimming control signal can be sent to controller through PWM signal, phase dimmer or I2C; The output load can be LED lamp or OLED lamp.

1 Claim, 11 Drawing Sheets

FIG.10
PWM
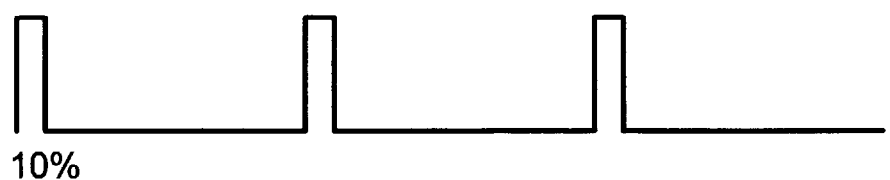
10%
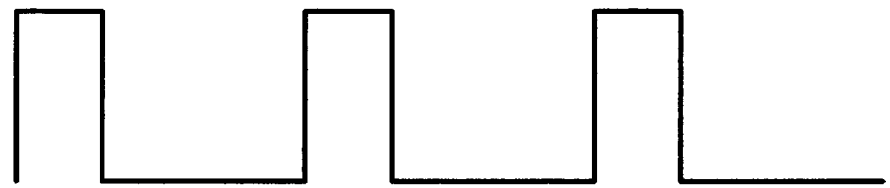
30%
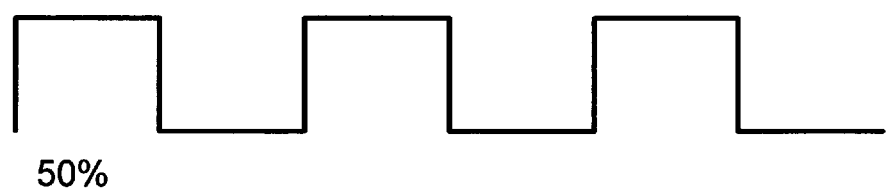
50%

DIMMING APPARATUS FOR LEDS

CROSS-REFERENCE TO RELATED APPLICATIONS

The present application claims priority to U.S. Provisional Patent Application No. 61/741,615, filed on Jul. 24, 2012, the entire contents of which are incorporated herein by reference.

BACKGROUND

The following disclosure is related to electrical circuits and signal processing.

Dimming for lamp is often used with switching power supply. Traditional dimming is realized by two ways:

1. Output current through LED lamp is a train of pulsed square waveform with high frequency; the duty cycle of the pulse current is adjusted to dim the LED lamp. This bring flicker at high frequency.

FIG. 1 shows a DC to DC or AC to DC converter used as power supply for the LED lamp with conventional pulsed current dimming way.

FIG. 2 shows the current waveform in the LED lamp of FIG. 1 with conventional pulsed current dimming way.

Output lamp brightness is proportional to output power of the DC to DC or AC to DC converter. Output power P=average(Vo*Io), Vo is constant, Io=Ifl (Ifl is current at full load) during on time Ton, Io=0 during off time Toff. So P=Vo*average(Io); P=Vo*Ifl*(Ton/Ts)=Vo*Ifl*D. (D is duty cycle and D=Ton/Ts). Output lamp brightness is proportional to duty cycle because Vo and Ifl are constant. So if we want to dim lamp at 10% brightness, we only need to set D=10%. Pupil usually opens wide at darkness and shrinks at brightness. Because the frequency is high, pupil cannot follow the change of light. So strong light stimulate retina during Ton with high frequency, long time the stimulation will hurt eyes and eyesight.

2. The output current is like rectified sinusoidal waveform in which partial of the waveform is 0; the conduction angle of input voltage for lamp is adjusted to dim the LED lamp. This way brings flicker at low frequency around 100 Hz or 120 Hz.

FIG. 3 shows an AC input power supply with a phase dimmer for LED lamp. A phase dimmer adjust conduction angle of input AC voltage. The phase dimmer is connected between AC input voltage source and bridge rectifier. And the voltage after rectified is directly applied to the lamp.

FIG. 4 shows voltage across LED and current through LED during dimming in FIG. 3. Output current is partial sinusoidal waveform. And output lamp is on when the voltage is above threshold voltage but output lamp is off when the voltage is less than threshold voltage. The lamp brightness dimming is just average of output power in one period. The average value of output power is higher, the lamp is brighter; the average value of output power is lower, the lamp is darker. Lamp brightness varies with low frequency (100 Hz or 120 Hz), the pupil open wide at darkness and shrink at brightness. Then the muscles to control the pupil keep shrinking and relaxing 100 or 120 times per second. So the eyes are very tired and easy to get myopia.

SUMMARY

In general and in one aspect, the specification describes a dimming way with power supply to dim the lamp without turning on and off lamp. The new dimming way is to adjust output voltage according to a dimming percentage of brightness.

When you want lamp brighter, you can increase output voltage across LED lamp series; when you want lamp darker, you can decrease output voltage across LED lamp series.

By this way, LED dimming is realized without turning on and off LED lamp. The LED lamp is dimmed without flicker.

Shockley Diode Equation:

$$I=I_S(e^{V_D/(nV_T)}-1),$$

I is the diode current, $I_S$ is the reverse bias saturation current (or scale current), $V_D$ is the voltage across the diode, $V_T$ is the thermal voltage, and n is the ideality factor, also known as the quality factor or sometimes emission coefficient. The ideality factor n typically varies from 1 to 2 (though can in some cases be higher)

Output power P=Vo*Io, at full brightness Vo=Vf, Vf is the voltage across diode at full brightness.

So at full brightness, output power Pf=Vf*Io=Vf*Is*(exp(Vf/(n*Vt))−1).

lnPf=ln(Is*Vf)+Vf/(n*Vt); (1 is too small compared with exp, so can be neglected)

let x is the percentage of lamp brightness; Vx, Ix are the voltage and current of the LED lamp to dim the lamp at x percentage of full brightness.

The power is Px=x*Pf=Vx*Ix=Vx*Is*(exp(Vx/(n*Vt))−1), (1 can be neglected) so we get logarithm for the equation, $$ln(x*Pf)=ln(Is*Vx)+Vx/(n*Vt);$$

then left side of equation is:

$$ln(x*Pf)=ln(x)+ln(Pf)=lnx+ln(Is*Vf)+Vf/(n*Vt);$$

$$ln(x)+ln(Is*Vf)+Vf/(n*Vt)=ln(Is*Vx)+Vx/(n*Vt);$$

$$ln(Vx/Vf)+(Vx-Vf)/(n*Vt)-ln(x)=0; \quad (1)$$

let $u=(Vx/Vf-1)$, $|u|<1$, $ln(Vx/Vf)=ln(Vx/Vf-1+1)$ $$ln(Vx/Vf)=ln(1+u)=u-u*u/2+u*u*u/3-u*u*u*u/4+\ldots+((-1)^{(n-1)})*((x^n)/n;$$

|u|<1, we can neglect the item with index above 2, So we get ln(Vx/Vf)≈u−u*u/2,

We rearrange equation (1), ln(1+(Vx/Vf−1))+Vf(Vx/Vf−1)/(n*Vt)−lnx=0

The equation (1) becomes u−u*u/2+Vf*u/(n*Vt)−ln(x)=0, we arrange the equation, $$U*u/2-(Vf/(n*Vt)+1)*u+ln(x)=0; \quad (2)$$

$$U=Vf/(n*Vt)+1\pm sqrt\{[Vf/(n*Vt)+1]*[Vf/(n*Vt)+1]-2*ln(x)\},$$

For dimming, x<1, Vx<Vf, u<0, $$so\ u=Vf/(n*Vt)+1-sqrt\{[Vf/(n*Vt)+1]*[Vf/(n*Vt)+1]-2*ln(x)\}, \quad (3)$$

Substitute u=(Vx/Vf−1) to (3), we get $$Vx/Vf=2+Vf/(n*Vt)-sqrt\{[Vf/(n*Vt)+1]^2-2*ln(x)\}$$

$$Vx=Vf*(2+Vf/(n*Vt)-sqrt\{[Vf/(n*Vt)+1]^2-2*ln(x)\}) \quad (4)$$

We can name dimming voltage as Vdim $$Vdim=Vf*(2+Vf/(n*Vt)-sqrt\{[Vf/(n*Vt)+1]^2-2*ln(x)\}) \quad (5)$$

For dimming percentage x,(0<x<100%), we can set voltage across the LED lamp as equation (4) to dim the lamp at x percentage brightness of LED lamp.

$$\text{LED current at full brightness } I(100\%)=Is*exp((Vdim(100\%)/(n*Vt))-1), \quad (6)$$

LED current at dimming x%, $I(x\%)=Is*\exp((Vdim(x\%)/(n*Vt))-1)$. (7)

If the total number of LED in series is m, the voltage across LED series is Vdim*m, and the voltage across LED series at dimming x% is $$Vdim*m(x\%)=m*Vf*(2+Vf/(n*Vt)-sqrt\{[Vf/(n*Vt)+1]^2-2*ln(x)\}).$$ (8)

Numerical analysis may get more accurate result than neglecting the item with index above 2.

DESCRIPTION OF DRAWINGS

FIG. 10 shows dimming control signal 504 in FIG. 5 is from a pwm signal sent to controller and used to control dimming level.

DETAILED DESCRIPTION

Figure 1:
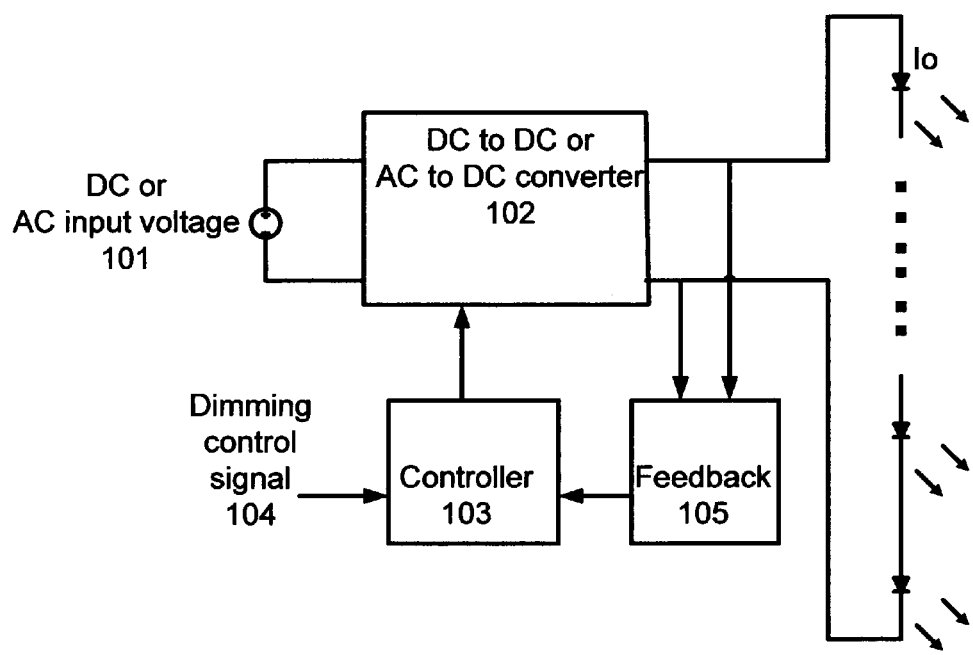
FIG. 1 shows a DC to DC or AC to DC converter used as power supply for the LED lamp with pulsed current dimming way.

FIG. 1 shows a DC to DC or AC to DC converter used as power supply for the LED lamp with pulsed current dimming way.

Input voltage 101 is either DC or AC voltage. DC to DC or AC to DC converter 102 supply a pulsed DC current to LED lamp with duty cycle corresponding to dimming percentage. Controller 103 receives dimming control signal 104 and sends control signal to converter 102 to control duty cycle of pulsed output current. Feedback 105 feed voltage or current back to controller to regulate out current reach predetermined value during LED on time.

Figure 2:
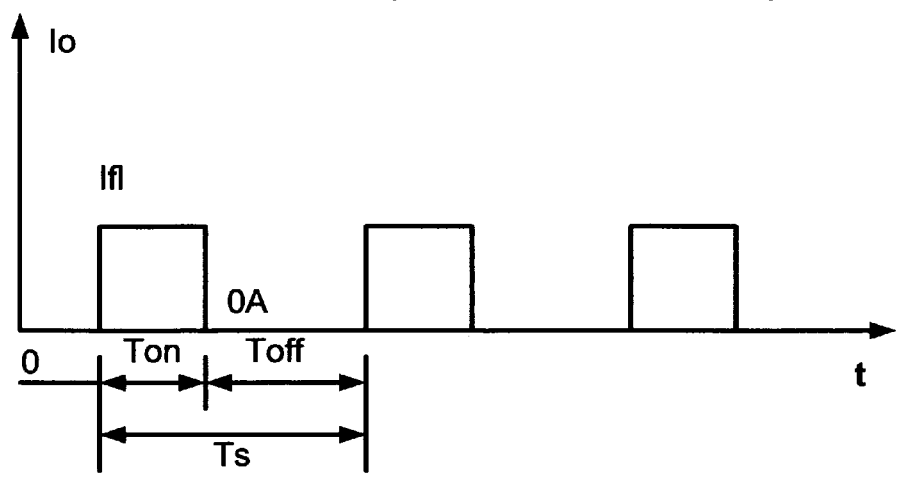
FIG. 2 shows the current waveform in the LED lamp of FIG. 1 with pulsed current dimming way.

FIG. 2 shows the current waveform in the LED lamp of FIG. 1 with pulsed current dimming way. Current is constant as Ifl that is full brightness current during on time and is 0 at off time. LED keeps flickering with high frequency. LED is very bright during on time but is dark during off time.

Figure 3:
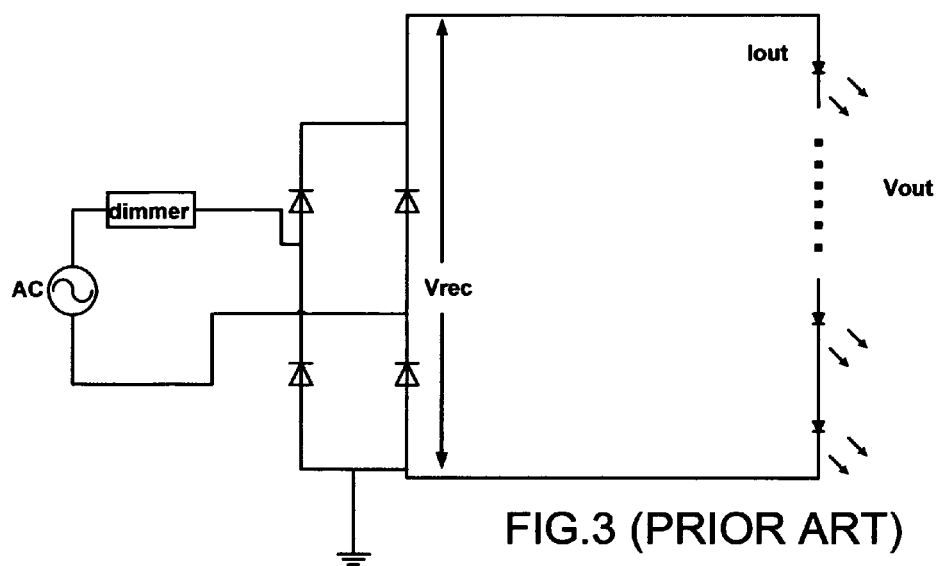
FIG. 3 shows an AC input power supply with a phase dimmer for LED lamp.

FIG. 3 shows an AC input power supply with a phase dimmer for LED lamp. The phase dimmer is between AC power input and bridge rectifier. The phase dimmer conduct angle is between phase angle 0 and phase angle π. When the phase dimmer is on, the AC power go through diode and is rectified to be a positive sinusoidal waveform at Vrec. When the phase dimmer is off, the voltage on Vrec is 0.

Figure 4:
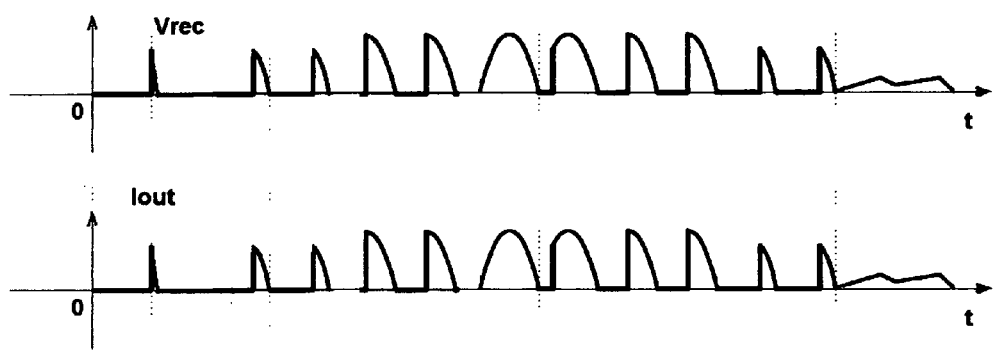
FIG. 4 shows voltage across LED and current through LED during dimming in FIG. 3.

FIG. 4 shows voltage across LED and current through LED during dimming in FIG. 3. LED current Iout is similar to voltage after dimmer. LED current is high when phase dimmer conduct and is low when phase dimmer does not conduct. LED is very bright during on time but is dark during off time. Pupil will open wide at darkness and shrink at brightness.

Figure 5:
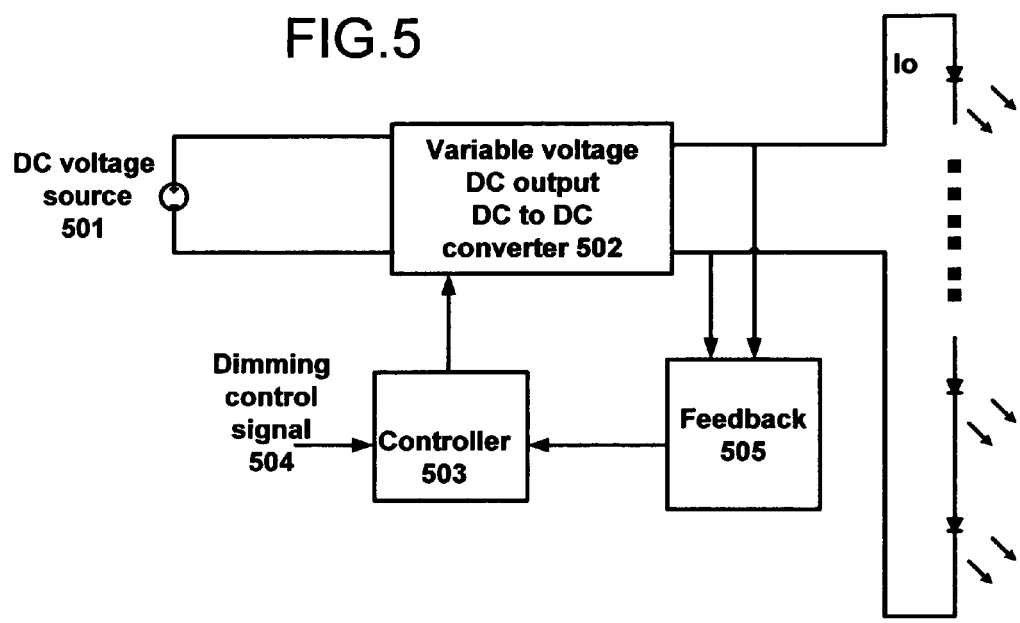
FIG. 5 is a block diagram of the invention with DC input voltage.

FIG. 5 is a block diagram of the invention with DC input voltage. The input DC voltage source 501 can be an adaptor, a battery or a DC power supply. Variable voltage DC output DC to DC converter 502 supply a DC voltage to output LED with a value determined by controller 503 based on dimming control signal 504. Feedback 505 feed output voltage or current back to controller to regulate output voltage at predetermined value.

Figure 6:
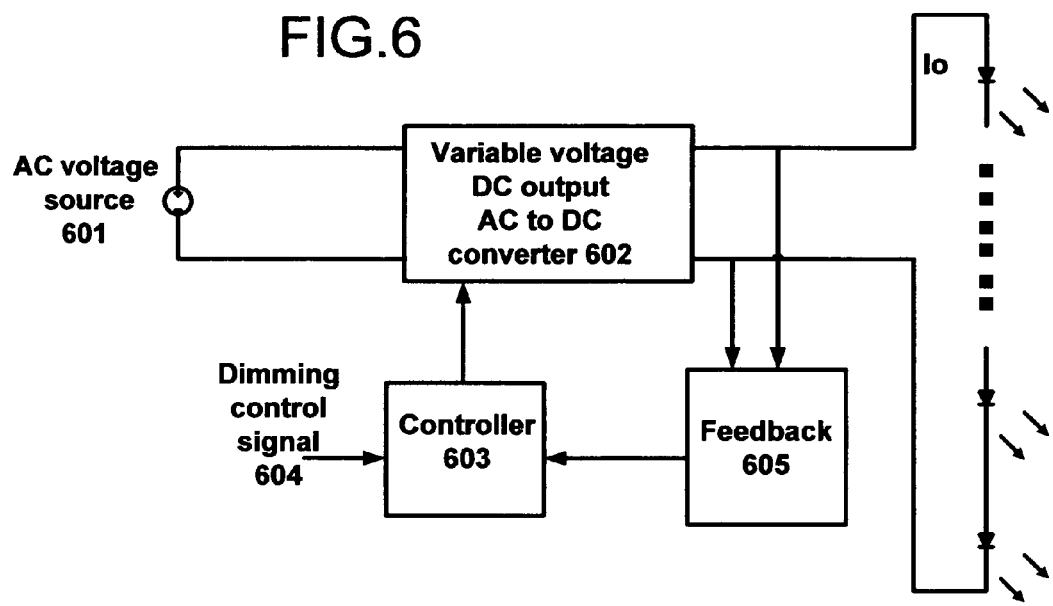
FIG. 6 is a block diagram of the invention with AC input voltage.

FIG. 6 is a block diagram of the invention with AC input voltage. The input AC voltage source 601 is either a power line or an AC voltage source. Variable voltage DC output AC to DC converter 602 supply a DC voltage to output LED with a value determined by controller 603 based on dimming control signal 604. Feedback 605 feed output voltage or current back to controller 603 to regulate output voltage at predetermined value.

Figure 7:
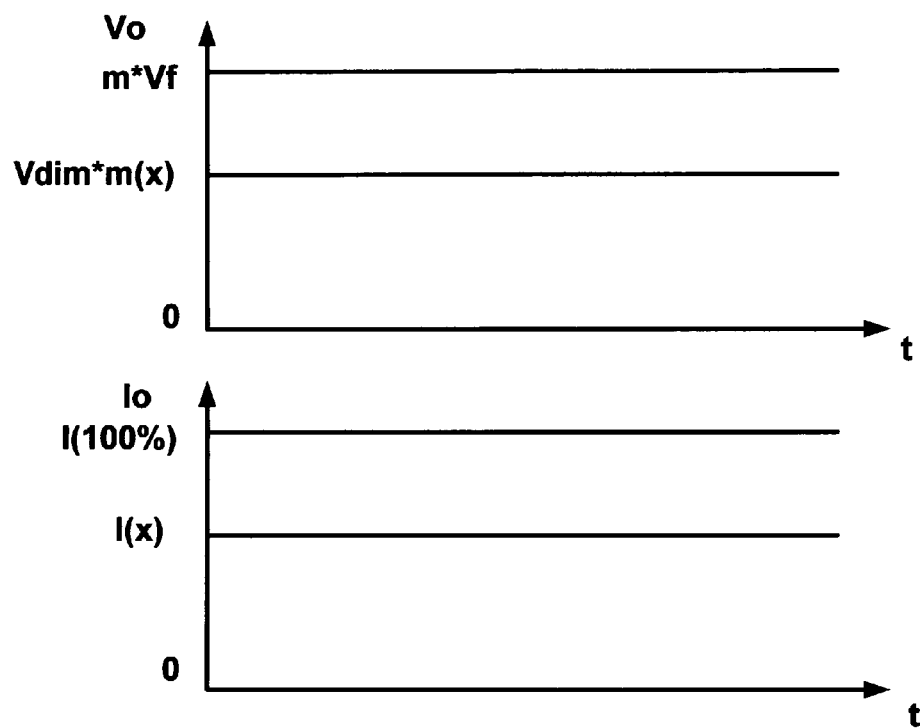
FIG. 7 shows the voltage Vo across the LED series and current Io through the LED series in FIG. 5 or FIG. 6 at x% dimming in the invention in one implementation.

FIG. 7 shows the voltage Vo across the LED series and current Io through the LED series in FIG. 5 or FIG. 6 at x% dimming in the invention in one implementation.

Vo is the output voltage across the LED series, Io is the output current through LED. m*Vf is the voltage across the LED series with number of m LED lamps at full brightness; Vdim*m(x%) is the voltage across the LED series with number of m LED lamps at x% dimming brightness; I(100%) is the LED current at full brightness; I(x%) is the LED current at x% diming brightness.

Figure 8:
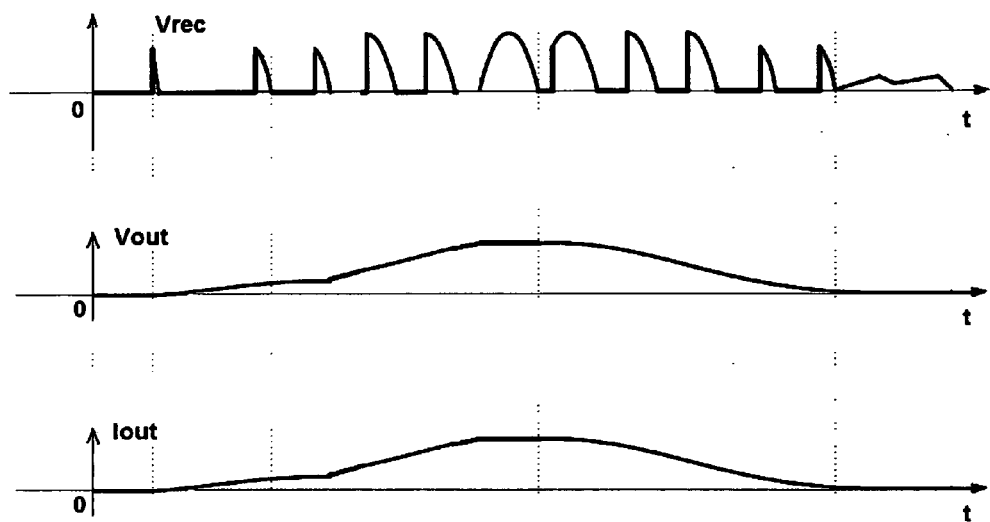
FIG. 8 shows the voltage Vo across the LED series and current Io through the LED series in FIG. 6 at x% dimming in the invention in one implementation with phase dimmer.

FIG. 8 shows the voltage Vo across the LED series and current Io through the LED series in FIG. 6 at x% dimming in the invention in one implementation with phase dimmer. Dimming control signal 604 is coming from phase dimmer. When phase dimmer is on, the voltage after bridge rectifier Vrec is high voltage; when phase dimmer is off, the voltage after bridge rectifier Vrec is 0. Output voltage and current never turn on or off. Output voltage is variable corresponding to conduction angle of phase dimmer. Output voltage is constant for a specific conduction angle. For a specific phase conduction angle 'A', the dim percentage is A/π in one implantation, 0<A<π. So the AC to DC converter 602 supply a voltage corresponding to dimming percentage=A/π.

Figure 9:
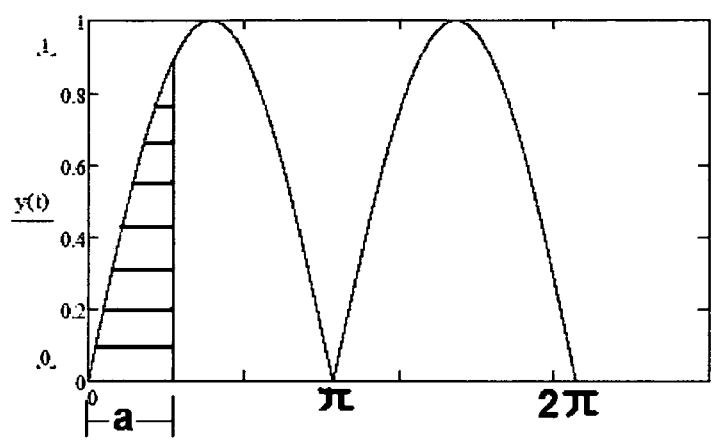
FIG. 9 shows a phase conduction angle of a phase dimmer with rectified AC voltage.

FIG. 9 shows a phase conduction angle of a phase dimmer with rectified AC voltage. Phase angle is angle 'a' in radian. So dimming percentage is a/(π) in one implementation.

FIG. 10 shows dimming control signal 504 in FIG. 5 that is from a pwm signal sent to controller and used to control dimming level. The dimming percentage is determined by duty cycle of PWM signal in one implementation. If duty cycle of PWM signal is 10%, then the LED lamp dimming level is 10%.

Figure 11:
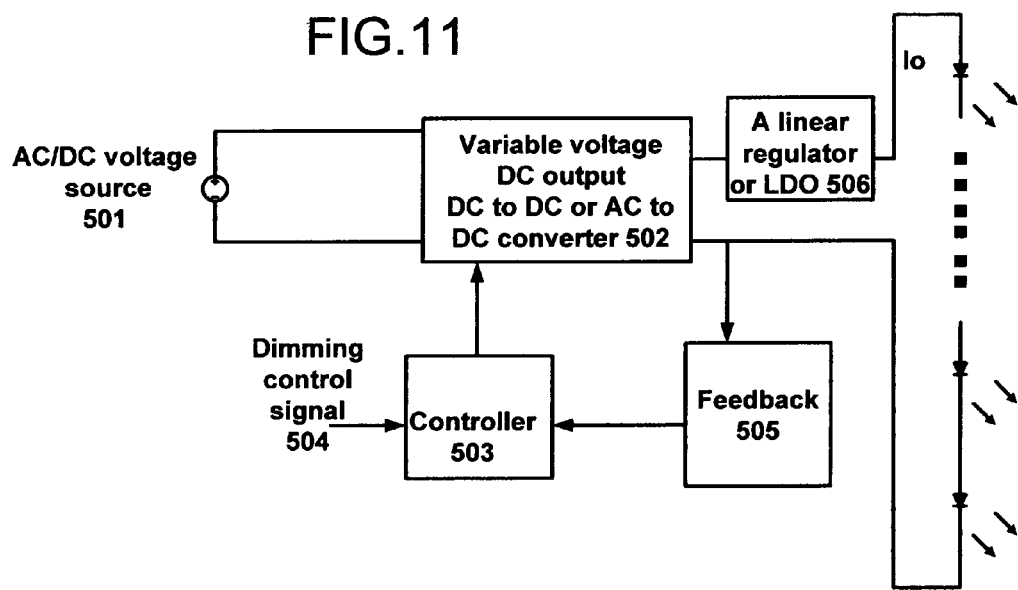
FIG. 11 is a block diagram of the invention with an AC input voltage or a DC input voltage, a linear regulator or a LDO is between the converter output and LEDs.

FIG. 11 shows a filter connected between a power supply and a LED or an OLED lamp. The lamp can be any of the following: One LED, one OLED, LEDs in series or in array, OLEDs in series or in array. An input power supply comes from a DC or an AC voltage source 501, a voltage converter 502 has a variable DC output voltage with the value corresponding to a dimming control signal 504, the dimming control signal 504 determines the dimming percentage, a feedback 505 either feedbacks the voltage of converter 502 or the voltage of LDO 506 to a controller 503, Or the feedback 505 feedback the current through the LEDs to a controller 503, The feedback 505 use either a constant reference voltage or a variable reference voltage corresponding to the dimming control signal 504, the controller 503 either control the reference voltage of the feedback 505 to change the output voltage of the converter 502 or control the output voltage of the converter 502 corresponding to the dimming control signal 504.

The dimming control signal 504 discussed can come from keyboard, a potentiometer, a GUI, a memory or a computer. The input to controller 503 can be based on PWM or I2C for DC input voltage.

The dimming control signal 604 discussed can come from phase dimmer, keyboard, a potentiometer, a GUI, a memory or a computer. The input to controller 603 can be based on phase angle, PWM or I2C.

But the control signal is not limited to PWM, phase angle or I2C. The control signal in the invention can come from a phone or a remote controller.

I2C has two lines one is SDA that is data line and SCL is a clock line. Data are exchanged between master and slave.

The output voltage is varied either by changing output voltage divider value or reference voltage. But it is not limited to these. The output voltage change can also be set by programmed software or a table in a digital controller memory.

The lamp is LED or OLED.

What is claimed is:

1. An apparatus for dimming lighting comprising:
    a DC voltage source that is either generated from an adapter or a battery, the voltage source operable to supply a DC voltage to a variable voltage converter;
    the variable voltage converter is a DC to DC converter operable to supply a voltage to LED lamps with the voltage value determined by the desired dimming percentage of the LED lamps;
    a dimming input controller operable to receive a feedback signal and change a reference voltage of the power supply to set an output voltage of the converter at the value corresponding to the desired dimming percentage of the LED lamps;
    the dimming input controller is a digital signal process controller that receives a dimming control signal;
    a linear regulator filter controls output of the variable voltage converter to the LED lamps.

* * * * *